Aug. 15, 1967
E. R. ATKINSON
3,335,636
FULLY AUTOMATED PROCESS CAMERA
Filed Dec. 31, 1964
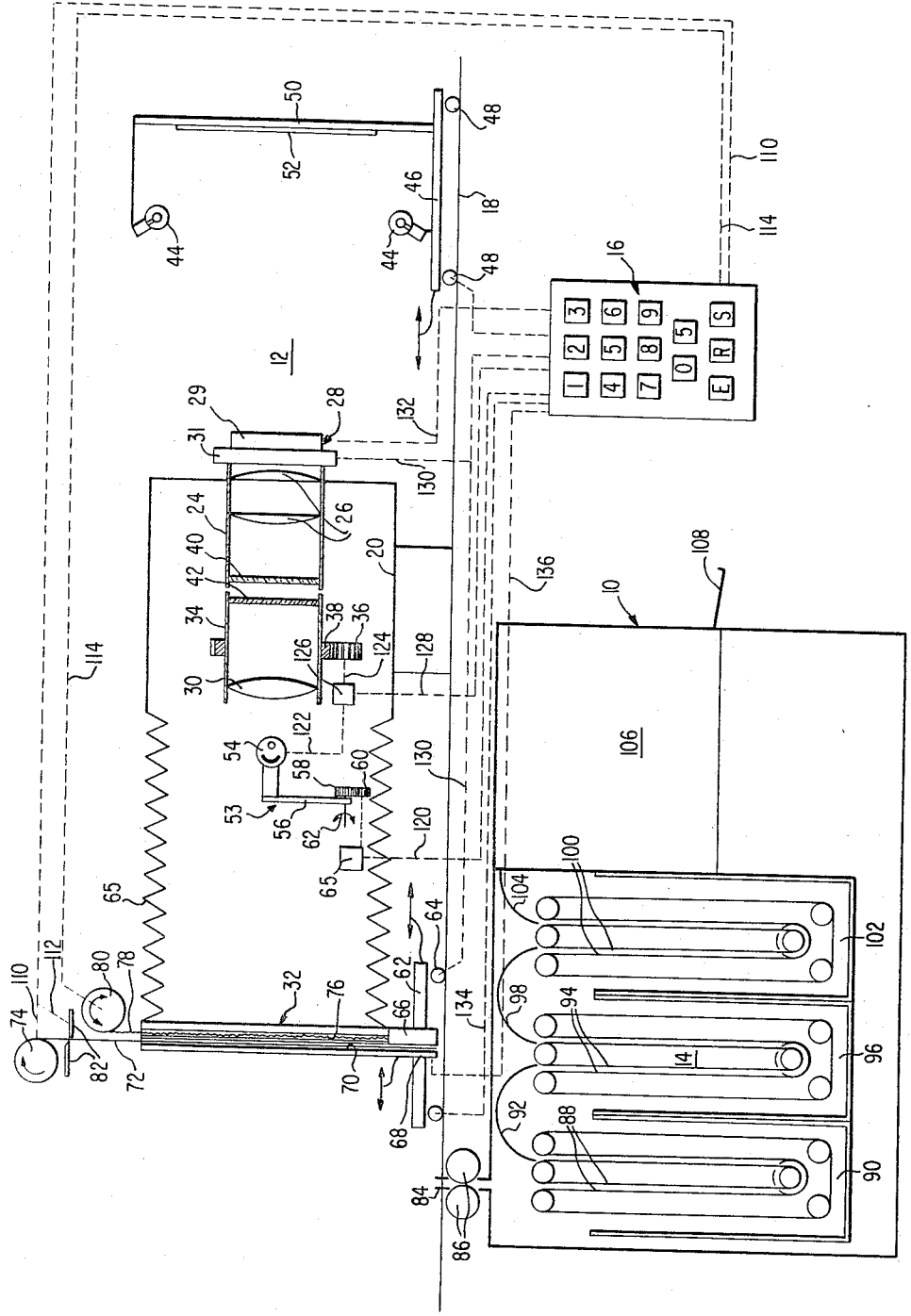
INVENTOR
EDWARD R. ATKINSON
BY Robert G. McMorrow
ATTORNEY 3,335,636
FULLY AUTOMATED PROCESS CAMERA
Edward R. Atkinson, 366 S. Troy St.,
Aurora, Colo. 80010
Filed Dec. 31, 1964, Ser. No. 422,811
9 Claims. (Cl. 88—24)

This invention relates to a fully automated process camera and more particularly to a process camera of this type which has specific applicability to the production of black and white line and half-tone negatives.

The apparatus of the present invention employs the principles of constant contrast and density range control set forth in my copending application Ser. No. 400,636, filed Sept. 24, 1964.

In lithographic, rotogravure, and photoengraving establishments, it is necessary to rapidly provide black and white line and half-tone negatives. At the present time, the processes for providing such negatives are done manually. These processes, in general, involve taking the copy, placing it in the vacuum copy or glass frame in front of a camera, manually positioning the front section of the camera which holds the lens board to the percentage of reduction required and then proceeding to the front of the camera and moving the copyboard to the appropriate position for the same percentage reduction. The operator then returns to the back of the camera, within the darkroom, and places a piece of film on the vacuum frame in the back of the camera and if a half-tone negative is desired, a contact screen is placed in position on top of the film. Manual movement of the vacuum back of the camera into position next occurs, whereupon the operator leaves the darkroom, returns to the front of the camera and sets the timer for a time exposure in the order of one-half to two minutes which, in most cases, is based purely upon guesswork and a sense of judgment acquired through years of experience. The lens cap is removed and the shutter is opened either manually or electronically. At the end of the timed exposure, in which the operator normally notes the time on the clock and manually closes the lens shutter, the lights are turned off, the operator goes back into the darkroom, removes the contact screen and places it in a drawer and takes the film off the vacuum frame and transports it to a sink or stand within a tray containing chemicals and manually processes the film.

Where the films are processed manually, they are transported from the camera after exposure to the darkroom spaced some distance therefrom. During the process of development, the operator normally examines each half-tone by eye with a magnifying glass over the light source to determine whether it is exposed correctly and if proper exposure is not achieved, he may return it to the developing tray for an extended period of time with all of the process steps occurring as a result of judgment rather than based upon any scientific testing. In the case of half-tone negatives, the resulting dots may be too large and the operator may have to manually treat the dots with cyanide to get the proper dot value prior to forming the print on the metal by conventional plate formation techniques. It is obvious that the process is extremely timely, highly cumbersome and highly subjective, resulting in a large number of rejects, thereby requiring a great deal of duplication of effort. Since the work is both subjective and manual, the process is not capable of repetition to provide a series of prints having constant contrast and density range. Since the contrast and light intensity is set and controlled by the operator, and since human judgment is used to determine the type of exposure and the lens stop used, the known process techniques are completely unsatisfactory and expensive.

It is therefore a primary object of this invention to provide a fully automated process camera for producing black and white line and half-tone negatives or positives characterized by constant contrast and density range which completely eliminates the need for operator control of such factors as density range, contrast, light intensity, light output and light temperature.

It is a further object of this invention to provide an improved automated process camera of this type which completely eliminates the need for make-overs and in which, the operator, after properly positioning the image to be copied, needs only set the controls for the percentage of reduction or enlargement desired and the control determining a line or half-tone print with the subsequent machine operation being fully automated.

Other objects of this invention will be pointed out in the following detailed description and claims and illustrated in the accompanying drawing, which discloses, by way of example, the principle of this invention and the best mode which has been contemplated of applying that principle.

In the drawing:

FIGURE 1 is a schematic, elevational view of a fully automated process camera forming one embodiment of the present invention for producing photoreproductions, either negative or positive, of black and white line and half-tone prints.

In general, the present invention is directed to a fully automated process camera for photographically reproducing originals including means for positioning each original to be reproduced at an object plane and spaced forwardly of a lens assembly and means for illuminating each original with a constant intensity, constant temperature light source. Means are provided for maintaining the light intensity passing from said lens assembly toward said focal plane at a predetermined constant value. Means responsive to the light intensity reaching the predetermined value effects positive positioning of a sensitized film at the focal plane spaced rearwardly of the relatively fixed lens assembly and further means responsive to positioning of the film at the focal plane causes exposure of the film for a constant period of time. Means responsive to the completion of the film exposure causes the film to move to a film processing station whereby each exposed film is passed sequentially through developing, fixing and washing stations under constant timed conditions whereby the apparatus automatically produces photographic reproductions characterized by contant contrast and density range regardless of the photographic characteristics of the original being reproduced.

Referring to FIGURE 1, there is shown, in a preferred form, an improved, fully automated process camera specially applicable to the making of black and white line and half-tone prints. The apparatus comprises a completely enclosed, lightproof housing 10 incorporating two primary process sections, a camera and vacuum frame section 12 and a film developing section 14. The third principal component of the system is a control center indicated at 16 which is shown as depending from the camera section 12 but may be positioned anywhere with respect to the two major components.

The camera and vacuum frame section 12 includes a generally horizontal base member 18 which acts to fixedly support a lens assembly 19 including a cylindrical lens holder 20 by means of a vertical support member 22. Concentric to cylinder 20 is fixed cylinder 24 which includes a pair of spaced lens members 26 which cooperate with primary lens and shutter assembly 28 fixed thereto. A member 30 for focusing an image at the focal plane in the vicinity of the vacuum frame is shown generally at 32. A second cylinder 34 is positioned coaxially of cylinder 24 and is mounted for rotation about its axis by means of a driving pinion 36. Concentric gear member 38 surrounds the cylinder 34 and is concentric thereto in mesh with the pinion 36. The rotatable cylinder 34 may carry another lens 30 for proper focusing.

Of great importance to the present invention is the utilization of a pair of polarizing elements or discs, indicated respectively at 40 and 42 which are coaxially aligned and fixed to respective cylinders 24 and 34 so as to vary the light passing through the lens assembly from the light source. The phenomena of light polarization is well known and it is obvious that if the moving cylinder 34 rotates with respect to the fixed cylinder 24, the intensity of light passing through the combined polarizing elements 40 and 42 will vary depending upon the relative angular position of one of the elements with respect to the other.

In this respect, a pair of light sources in the form of lamps 44 are fixed upon a movable support member or carriage 46, the movable support member carries a pair of reels 48 which move along horizontal support surface 18 to position the carriage 46 with respect to the fixed lens assembly 19. The carriage 46 has a vertical support member 50 forming an object supporting board, and as shown, has an original 52 affixed to the front surface of the board. In the manner of the photographic reproduction techniques set forth in the above-identified application, the light sources 44 are of the constant temperature, contant voltage type and in the preferred embodiment, are fixed to the carriage 46 and moved therewith. They are at a fixed distance with respect to the object plane passing through object 52. Therefore, the position of the light source 44 and its intensity remains constant regardless of the original being processed. Reflected light passes from the object 52 through the various elements of the lens assembly 19 and is directed on the vacuum frame positioned at the focal or image plane. Further in keeping with the above-identified application, a photocell or other light intensity measuring device 54 is positioned between lens assembly 19 and the focal plane. The photocell 54 is shown as being fixed to a vertical support member 56 which is fixedly attached at its opposite end to gear member 58, this gear being driven by gear 60 in mesh therewith through drive means 65. The photocell 54 is shown as being coaxially positioned with respect to lens assembly 19 and therefore measures, in this position, the intensity of light emanating from the lens assembly 19. In the manner of my copending application, additional light measuring means may be employed between light source 44 and focal plane 32 to maintain the constant light intensity control desired. Arrow 62 indicates that the support member 56 may rotate the cell 54 in and out of position in front of the lens assembly so that the intensity of light emanating from the lens assembly may be measured.

The vacuum frame assembly 32 is carried by a second movable carriage member 62 which likewise is mounted upon a pair of spaced wheels 64 for movement over the fixed horizontal base member 18. Bellows 65 couples frame 32 to cylinder 20. As indicated by the horizontal arrows, both carriage 62 and carriage 46 are movable longitudinally of the apparatus to correctly position both the sensitive film and the photographic original to be copied with respect to the fixedly positioned lens assembly 19. The vacuum frame assembly 32 is shown in simplified form to include front and rear plates 66 and 68, respectively, which may be moved toward and away from each other (by means not shown) to allow a photosensitive film 72 to be inserted within a slot 70 formed thereby. The film 72 emanates from a roll 74 which is carried by the carriage 62, the roll acts through means (not shown) to deposit a sheet from the film roll within the vacuum frame in a fully automated manner to be described hereafter. Likewise, a second slot 76 is formed immediately behind the front plate 66, the slot 76 acting to hold the half-tone screen 78 which moves downwardly within its respective slot automatically when a half-tone photographic reproduction is desired. The roll 80 carrying the screen 78 is likewise fixed with respective carriage 62 and movable therewith. A pair of opposed cutting members 82 are shown positioned between roll 74 and slot 70. They are movable with respect to each other through means (not shown) to automatically sever a sheet of sensitized film material after the film has been positioned between the inner and outer rolls of the vacuum frame assembly 32.

A properly exposed film sheet may be processed within the process section 14 by moving the carriage 62, through means (not shown), from the position shown to an extreme left position wherein slot 70 is aligned with slot 84 whereupon opening of the vacuum frame members 66 and 68 will allow the sheet to drop by gravity to a position where they will be caught between the nip of the driven rollers 86 and forced downwardly into the process section 14. The two rollers 86 also act as a light guard on the top of the processing unit 14 and the sheet moves downwardly between a pair of spaced driven belts 88, for instance, into a first processing tank 90 carrying the developing liquid. The belts 88 are driven at a desired speed so that the sheet passes through the developing liquid within tank 90 in a U-shaped path. The sheet moves out of tank 90 into contact with curved guide member 92 for passage between a second pair of spaced belts 94 carrying the sheet into a fixing bath, for instance, within central tank 96. The sheet next passes upwardly into contact with a second curved guide member 98 where its direction is reversed causing the sheet to again move downwardly between a third pair of spaced drive belts 100 and into a third bath consisting, for instance, of a washing solution within tank 102. After developing, fixing and washing, the print passes upwardly and out of the processing section 14 and as a result of movement into contact with the curved guide member 104 passes into a drying chamber indicated generally at 106. The details of the drying chamber are unimportant and are quite conventional. After drying sufficiently, the finished print is discharged from the fully automated process apparatus upon an inclined support member 108 extending away from the housing proper.

As mentioned previously, the apparatus of the present invention is completely automatic and produces prints having constant contrast and density range in a fully automated process in which all of the factors are constant for each print so processed, regardless of the condition of the original from which the copy is being made, with the exception of the changes made by the apparatus in an automatic manner depending upon the desired percentage of reduction or enlargement. In this respect, the apparatus includes a very simple control center indicated at 16 carrying a minimum number of push button or like manually operated control members. There are fourteen control buttons shown, the first nine indicating the percentages in tens, that is, 10%, 20%, 30%, 40%, 50%, 60%, 70%, 80% and 90%. The fourth row of buttons indicated as 0 and 5 give the option of either a one-to-one reproduction size ratio by pushing the 0 button or a 5% variation to the first nine push buttons. For instance, by pushing the number 5 button in the second row alone, a 50% reduction occurs. By pushing the 5 button in the second row and the 5 button in the fourth row, a 55% size variation is achieved. Referring to the bottom row of buttons, the first button indicated at E denotes enlargement while the second button R indicates reduction. Thus, for a 55% enlargement, the E button is pushed, the 5 button in the second row and the 5 button in the fourth row are pushed. For a 55% reduction (a 55% reduction in size) the 5 button of the second row and the 5 button of the fourth row are pushed as well the R button in the last row. For half-tone photography, a screen must be used. As indicated, the last button in the bottom right-hand corner carries the letter S and is pushed when half-tone photography is required, whereupon the screen 78 is automatically positioned in front of the vacuum frame film.

The fully automated apparatus operates as follows: The operator places the original to be photoreproduced upon the copyboard as at 52 located at the front of the camera. This is the only manual operation required of the operator with respect to the apparatus other than the manual positioning of the desired push buttons on control panel 16. Assuming that the reproduction is to have a percentage reduction of 55%, the operator, after placing the copy onto the copyboard 52, then pushes the 5 button in the second row of the board and the 5 button in the fourth row and at the same time pushes the R button in the last row. The board carrying the copy 52 will move into a position representative of the 55% reduction, this position being based upon the logarithmic scale and the copyboard and the carriage carrying the vacuum frame will position itself automatically at the desired position with respect to the fixed lens assembly 19. The dotted lines indicated schematically at 130 show the control signals emanating from the control center 16 to automatically control both carriages 46 and 62 and also the lens assembly 19, specifically the aperture 31 of assembly 28. At the time of arrival of the carriages 46 and 62 to the proper positioning points with respect to the fixed lens assembly 19 and obtaining of the proper aperture size for this percentage reduction of print, the light-sensitive photocell 53 is actuated automatically to move the photocell 54 into the position shown directly in line with the lens assembly 19. The control signal passes from center 16 to actuator 65 through dotted line 120. It is assumed, of course, that the light emanating from light source 44 is always at a constant value, this being provided automatically by proper selection of constant intensity light sources having some voltage control means (not shown) whereupon the voltage across the lamps remains constant to provide the desired constant conditions. Constant intensity, constant temperature light source control may be achieved by conventional voltage regulator means, such as that set forth in United States Patent 2,749,799 to Thomas Strem, patented June 12, 1956. With the photocell 54 positioned in line with the lens assembly, the light passing through the lens assembly will be measured by the photocell. This electrical signal passes back to the control center 16. The value of the current passing through the photocell circuit is directly proportional to the intensity of light falling upon the photocell and this signal is directed through line 122 to power means 126 acting to rotate the small pinion gear 36 to drive the rotatable cylinder 34 with respect to fixed cylinder 24. Assuming the light passing through the fixed lens assembly 19 is too bright, the rotatable polarizing disc 42 will rotate with respect to the fixed polarizing disc 40 to reduce the intensity of light passing through the lens system.

In line with the principles of my prior patent application, Ser. No. 400,636, the intensity of light emanating from the lens assembly and passing to the focal plane in the position occupied by the vacuum frame assembly 32 will remain constant for all photoreproductions of constant size. In this respect, the control center is so set that when the photocell 54 produces a signal indicating the desired light intensity, the rotatable cylinder 34 stops with respect to the fixed cylinder 24 with the polarizing discs 40 and 42 being in the proper position. A signal indicative of the desired position passes from the rotation initiating and control means 126 by means of dotted line 128 back to the control center 16 to initiate automatically a further sequence of events.

At this time, shutter 29 closes through a signal carried by dotted line 132 and the control center directs the sensitive film roll 74 through drive means (not shown) via line 110 to rotate clockwise to allow film 72 to move as a result of gravity downwardly between the now opened ends 66 and 68 of the vacuum frame within slot 70. Film sensing means (not shown) note the full insertion of the film 72 within slot 70 and act to stop rotation of reel 74 and to close the ends 66 and 68 of the vacuum frame through signal line 136 and means (not shown) to securely position the film at the focal plane in a position for photoreproduction. At this point, a suitable termination signal is sent through dotted line 110 to the film roll 74 and its associated mechanism for effecting this series of events. Subsequent thereto, a signal is sent from the control center through line 112 to the cutter members 82 causing the cutters to move relative to each other to sever the inserted end of the film 72 which is now being held by the vacuum frame.

If desired, upon manual movement of the push button marked S, the signal will be sent via dotted line 114 to reel 80 carrying the half-tone screen 78. Means (not shown) associated with the reel causes the reel to rotate in a counterclockwise direction moving the screen 78 downwardly within slot 76 to position the screen in front of the sensitized film 72 carried by the vacuum frame assembly 32. Means (not shown) carried by the carriage 62 sense the proper position of the screen within its respective slot and terminate further rotation of the reel 80 in the counterclockwise direction. The photocell assembly 53 has now rotated to a position out of the path of light emanating from the fixed lens assembly toward the focal plane and a further signal through line 132 operates the shutter 29 to cause the shutter to open and remain open for the constant, timed period, which may be, for instance, either one minute or two minutes or whatever the appropriate time for producing the desired photoreproduction. After the shutter has closed, an appropriate signal will be passed to the carriage 62 through line 134 to cause the carriage to move to an extreme left-hand position in which the slot 70 of the vacuum frame is aligned with slot 84 of the film processing section 14, whereupon the front and back members 66 and 68 of the vacuum frame assembly automatically move apart as a result of a signal passed through line 136, allowing the sensitized film to fall between the light shield and drive rollers 86, thus delivering the exposed, sensitized sheet into the processing chamber 14. The sheet of exposed film passes downwardly through the guide members 84, the driver rollers or light shutters 86 and into the automated, timed processing chamber. The sheet of film, by means of a driven belt and fixed guide members, passes sequentially through the first bath of developing fluid within tank 90, a second bath of fixing fluid within tank 96 and a third bath of washing liquid within tank 102. Thereafter, the developed sheet passes into drying chamber 106 and out through an appropriate slot onto a discharge support 108.

It is apparent that the intensity of light arriving at the focal plane must be closely controlled since all reproduction processes require certain dot percentages in order to provide capable printing plates. In photoengraving, all negatives made by the half-tone process require a 10% dot at the light end and a 90% dot at the shadow end. In order to provide the desired range, light of a given intensity for a given exposure time must be provided by the use of the polarization means formed by the fixed and rotatable polarizing discs 40 and 42. The apparatus of the present invention is able to automatically control the amount of contrast and the amount of brilliance or intensity of light passing through the lens system. The lens aperture at 31 will control and make up for the distance the light travels from the lens to the focal plane. It is axiomatic that, if the focal plane, for instance, were 50 inches displaced from the fixed lens assembly, for one exposure the opening of the lens must be greater than if the distance that the light travels is only 20 inches. The lens opening, therefore, is governed by the distance in which the reduction or enlargement takes place, whereas the intensity of light needed to give the required dot percentages is completely controlled by the polarization filter which is located within or behind the conventional lens assembly. While it is envisioned that the time of exposure remains substantially constant, that is, the shutter is opened for the same length of time for each photo reproduced, and the photocell 54 merely controls the relative position of the polarizing discs to vary the intensity of light passing through the lens system and directed toward the focal plane, it is apparent that the output of the cell can also govern, in addition to or instead of, the time of exposure of the sensitive film.

It is obvious that if too much light hits the focal plane, those areas in which a 10% dot is desired, would become pure white and no dot at all would be printed. Likewise, too little light hitting the focal plane would cause too big a highlight dot to be formed. Thus, instead of getting a 5% white onto the printed surface, there would be produced a picture in terms of 40 and 50 percent grays. Therefore, there would result therefor a formation of a dot through the screen which would be 50% like a checkerboard instead of a pin point. The pin points are required at the white areas which carry very little ink, while much metal area is required to cover the blacks and dark areas of the copy. The apparatus of the present invention provides the intensity control at both ends, at one end to create the shadow dot and at the other end to create the highlight dot.

The control function of the photocell may be best seen in a discussion of what occurs when reproducing from an original in which the one-to-one size ratio is desired as contrasted to a photographic reproduction in which a size reduction of 50% is desired. If a one-to-one ratio is desired, the control center would provide a signal through dotted line 100, for instance, to the aperture control member 31, setting the aperture at, arbitrarily, an opening of $f/32$ which represents, for instance, an aperture one-half inch in diameter. When the light reflected from the image copy to the focal plane is of the desired constant value, the machine would automatically process and produce a finished print. Now, assuming that the original is to be reproduced at a 50% reduction in size, proper positioning of the push buttons to produce this print would result in a control signal passing through dotted line 100 to the lens aperture control member 31 to provide an aperture charge from $f/32$ to $f/45$ indicating an opening of approximately one-quarter of an inch in diameter. However, this does not necessarily control the intensity of light passing through the fixed lens assembly and the filter elements 40 and 42 would be automatically moved relative to each other until the same, constant light intensity desired is achieved, as measured by the photocell 54. Whereupon, further rotation of cylinder 34 ceases with respect to cylinder 24 and the subsequent process steps occur in the identical manner as in the production of the one-to-one ratio print. Both prints have the desired constant contrast and density range with the intensity of light at the focal plane being constant and the exposure time of two minutes or one minute or whatever is preset for the apparatus remains constant for both prints so as to produce the desired dot size enabling the reproduction processes involving photoengraving or lithography to be carried out in an expeditious manner without the need for make-overs or changes.

While contrast control is achieved in the present invention by the relative movement of a pair of polarizing discs 40 and 42 within or behind the camera lens assembly, contrast control may also be achieved by the relative positioning of the light sources 44 with respect to the image carrying board 50. Of course, it is the purpose to provide constant light transmission conditions throughout the apparatus to achieve the same control for the production of a series of prints characterized by constant contrast and density range as in my application referred to previously.

While it has been shown and described and pointed out the fundamental novel features of the invention as applied to a preferred embodiment, it will be understood that various omissions and substitutions and changes in the form and detail of the device illustrated and in its method of operation may be made by those skilled in the art without departing from the spirit of the invention. It is, therefore, the intention to be limited only as indicated by the scope of the following claims.

What is claimed is:

1. A fully automated process camera for photographically reproducing originals comprising: means for positioning each original at an object plane spaced from a lens assembly, means for illuminating each original with a constant intensity, constant temperature light source, means tending to maintain the light intensity passing from said lens assembly toward said focal plane at a predetermined constant value, means responsive to said light intensity reaching said predetermined constant value for positioning respective sensitized film at said focal plane, means responsive to positioning of said film at said focal plane for exposing each film for a constant period of time, and means responsive to completion of said film exposure for processing each exposed film by passing said film sequentially through developing, fixing and washing stations under constant, timed conditions whereby said apparatus automatically produces photographic reproductions characterized by constant contrast and density range regardless of the photographic characteristics of the original being reproduced.

2. A fully automated process camera for photographically reproducing originals manually fixed to a copyholder spaced from a relatively fixed lens assembly including a normally open shutter, said apparatus comprising: means responsive to manual initiation for positioning said copyholder in an object plane spaced forwardly of said lens assembly, and for positioning a film holder at a focal plane spaced rearwardly of said lens assembly, means for illuminating said original with a constant temperature, constant intensity light source, means for varying the intensity of light passing through said lens assembly toward said focal plane, means responsive to light intensity reaching said predetermined value for maintaining said light intensity passing this point constant, and sequentially closing said shutter and positioning a sensitized film within said film holder at said focal plane, means responsive to positioning of said film at said focal plane for opening said shutter to expose said film for a constant period of time and means responsive to closure of said shutter after film exposure for processing each film by passing said film sequentially through developing, fixing and washing stations under constant, timed conditions whereby said apparatus automatically produces photographic reproductions characterized by constant contrast and density range regardless of the photographic characteristics of the original being reproduced.

3. The apparatus as claimed in claim 1 further including a half-tone screen, and means responsive to positioning of said film at said focal plane for moving said screen into position adjacent said film at said focal plane prior to exposing said film to effect the production of half-tone prints under said constant process conditions.

4. The apparatus as claimed in claim 1 wherein said means tending to maintain said light at a predetermined constant value includes a first relatively fixed polarizing element forming a part of said lens assembly and positioned coaxially thereof and a second relatively movable polarizing element and means for effecting relative movement of said one polarizing element with respect to said other to vary the intensity of light passing through said lens assembly.

5. The apparatus as claimed in claim 4 further including: a photocell, means for moving said photocell into coaxial position between said lens assembly and said focal plane, said means being responsive to positioning of said original at said object plane and illuminating the same, and means responsive to the intensity of light striking said cell for variably positioning said relatively movable polarizing element with respect to said fixed element and means responsive to light intensity of a predetermined value for terminating relative movement of said polarizing elements.

6. The apparatus as claimed in claim 1 wherein said means tending to maintain said light intensity at a predetermined constant value comprises: movable support means for supporting said light source with respect to said original at said object plane, means for varying the position of said light source with respect to said original.

7. A fully automated process camera for photographically reproducing originals comprising: a camera section including a relatively fixed lens assembly employing fixed and movable polarizing elements, a normally open shutter and an adjustable aperture, a first relatively movable carriage including a copyholder fixed thereto for holding an original to be photographically reproduced at the object plane, a constant temperature, constant intensity light source fixed to said carriage and adapted to reflect light from said original toward said lens assembly, a second movable carriage including a film holder fixed thereto and positioned on the opposite side of said lens assembly from said first movable carriage, a photocell, means for positioning said photocell in a position coaxially of said lens assembly between said lens assembly and said focal plane, means responsive to the intensity of light falling upon said photocell for rotating said one polarizing element with respect to the other to vary the intensity of light passing through said lens assembly, means operable upon the light intensity reaching a predetermined value to terminate relative movement of said polarizing element, to move said photocell out of an axially aligned position with respect to said lens, to close said normally open shutter and to position a film within said film holder at said focal plane, means responsive to positioning of said film within said film holder for opening said shutter to expose said film for a constant period of time and means responsive to closure of said shutter after film exposure for processing said film by passing it sequentially through developing, fixing and washing stations under constant, timed conditions whereby said apparatus automatically produces photographic reproductions characterized by constant contrast and density range regardless of the photographic characteristics of the original being reproduced.

8. The apparatus as claimed in claim 7 further including a control center, said control center including a plurality of push buttons and means responsive to selective depression of said push buttons for determining the percentage of enlargement or reduction of the copy made from said original and for initiating said automatic sequence of events.

9. The apparatus as claimed in claim 8 wherein said apparatus further includes: a screen for half-tone print production, means for supporting said screen on said second carriage, a push button carried by said control center, and means responsive to depression of said push button for causing said screen to move into position in front of said sensitized film after said predetermined light intensity value has been reached.

References Cited
UNITED STATES PATENTS

| | | |
|---|---|---|
| 2,593,216 | 4/1952 | Sussin. |
| 2,596,376 | 5/1952 | De Goeij. |
| 2,749,799 | 6/1956 | Strem _____ 88—24 |
| 3,205,767 | 9/1965 | Weber et al. _____ 88—24 |

NORTON ANSHER, *Primary Examiner.*

R. A. WINTERCORN, *Assistant Examiner.*